UNITED STATES PATENT OFFICE.

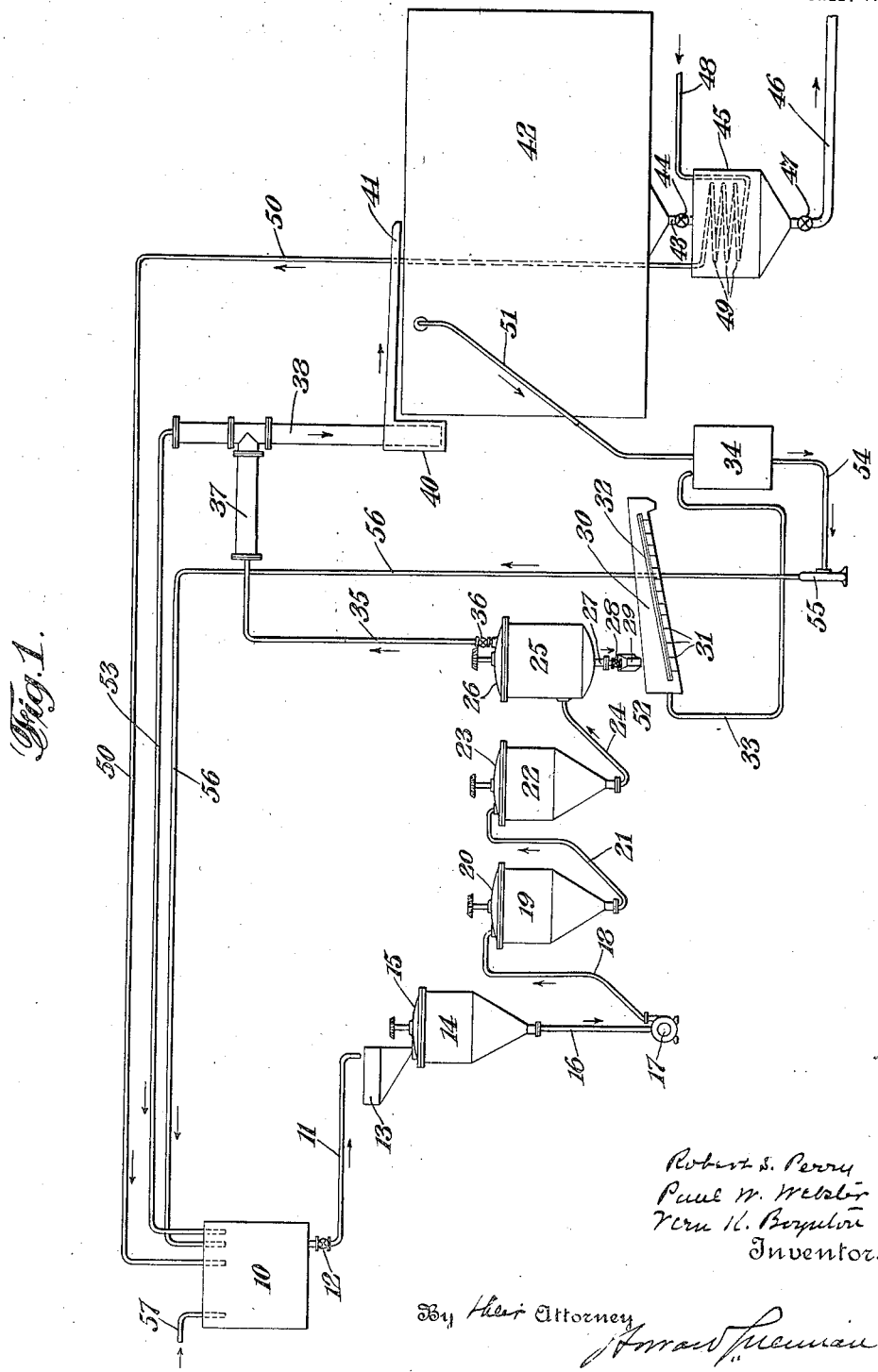

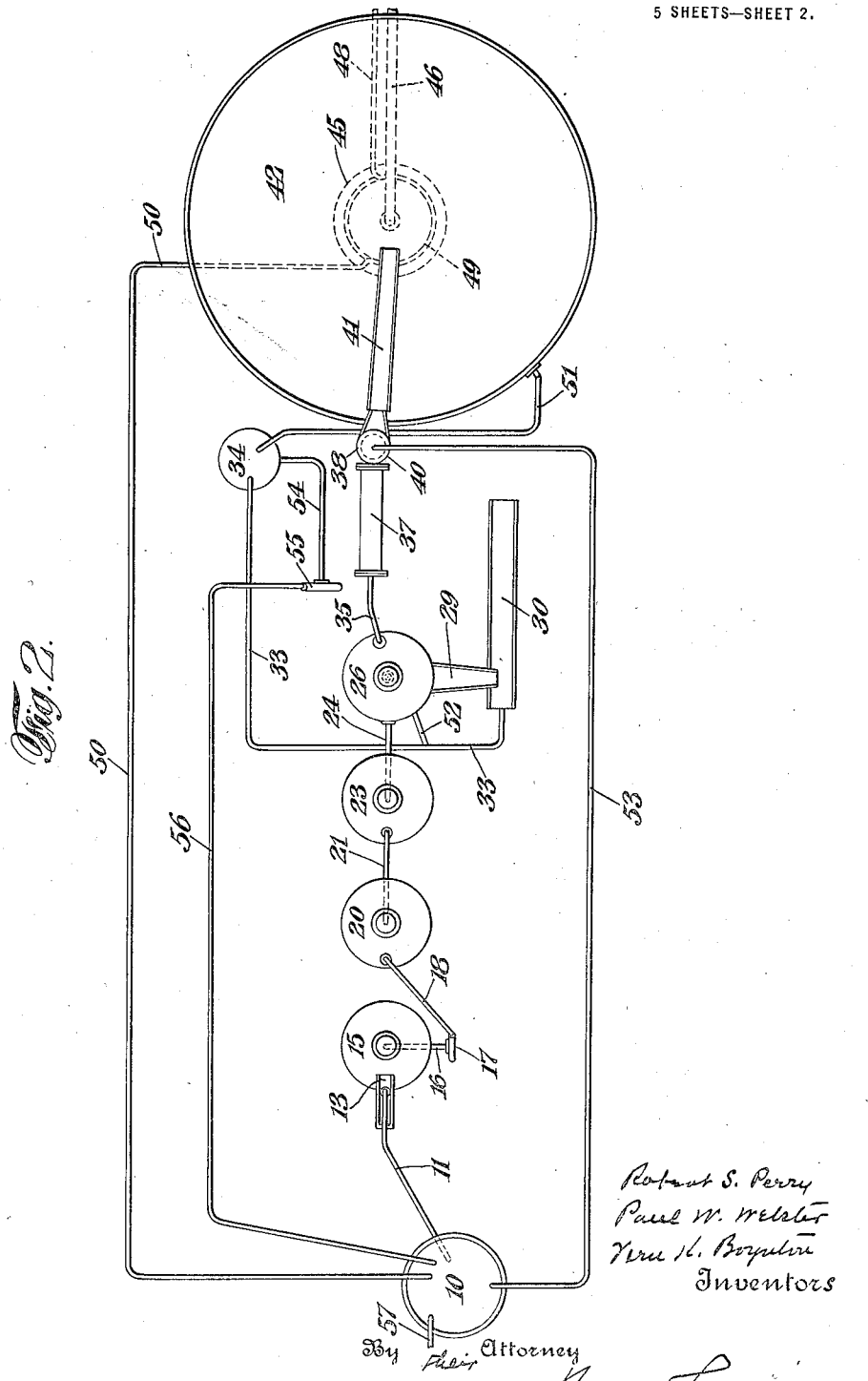

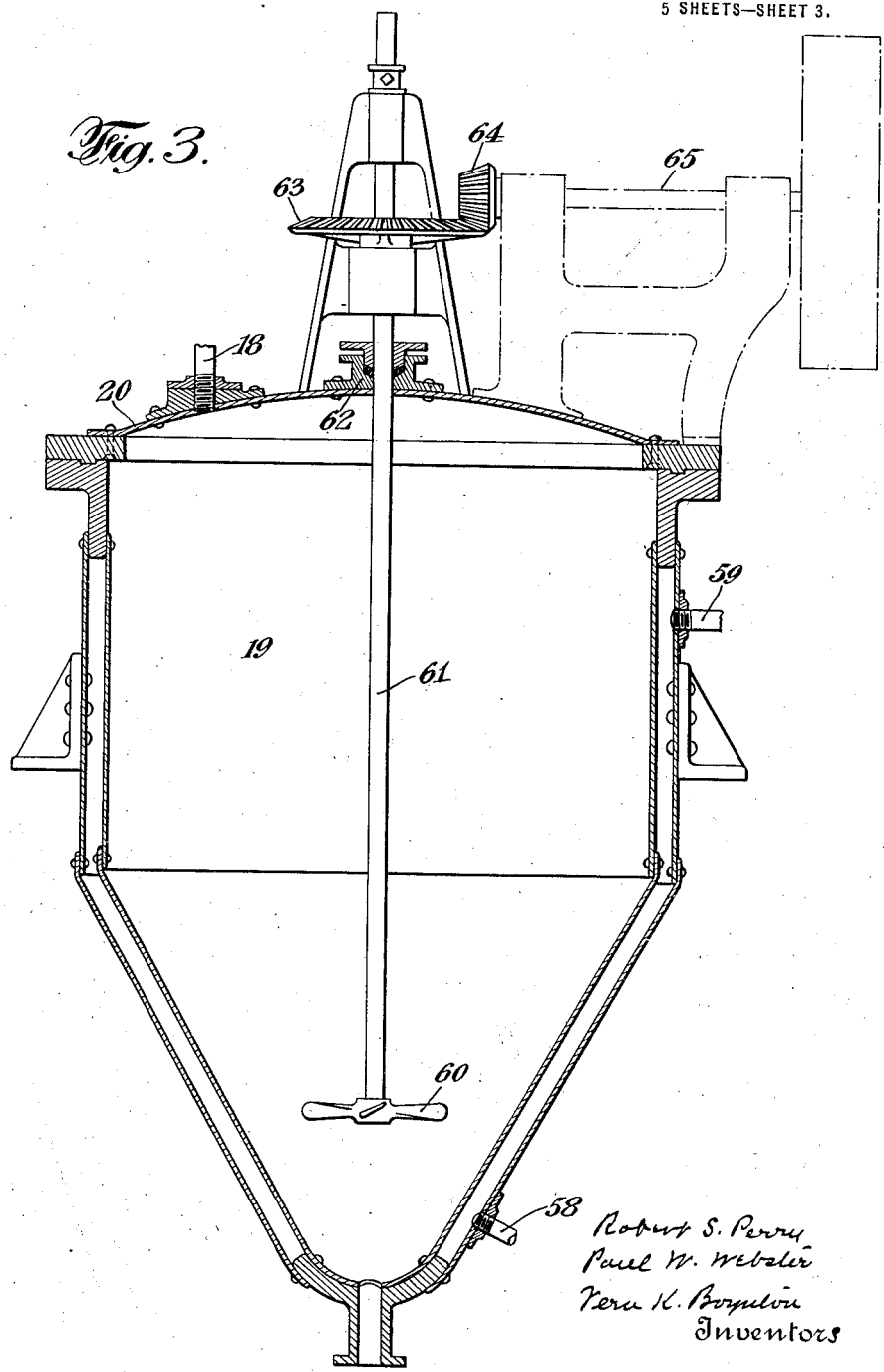

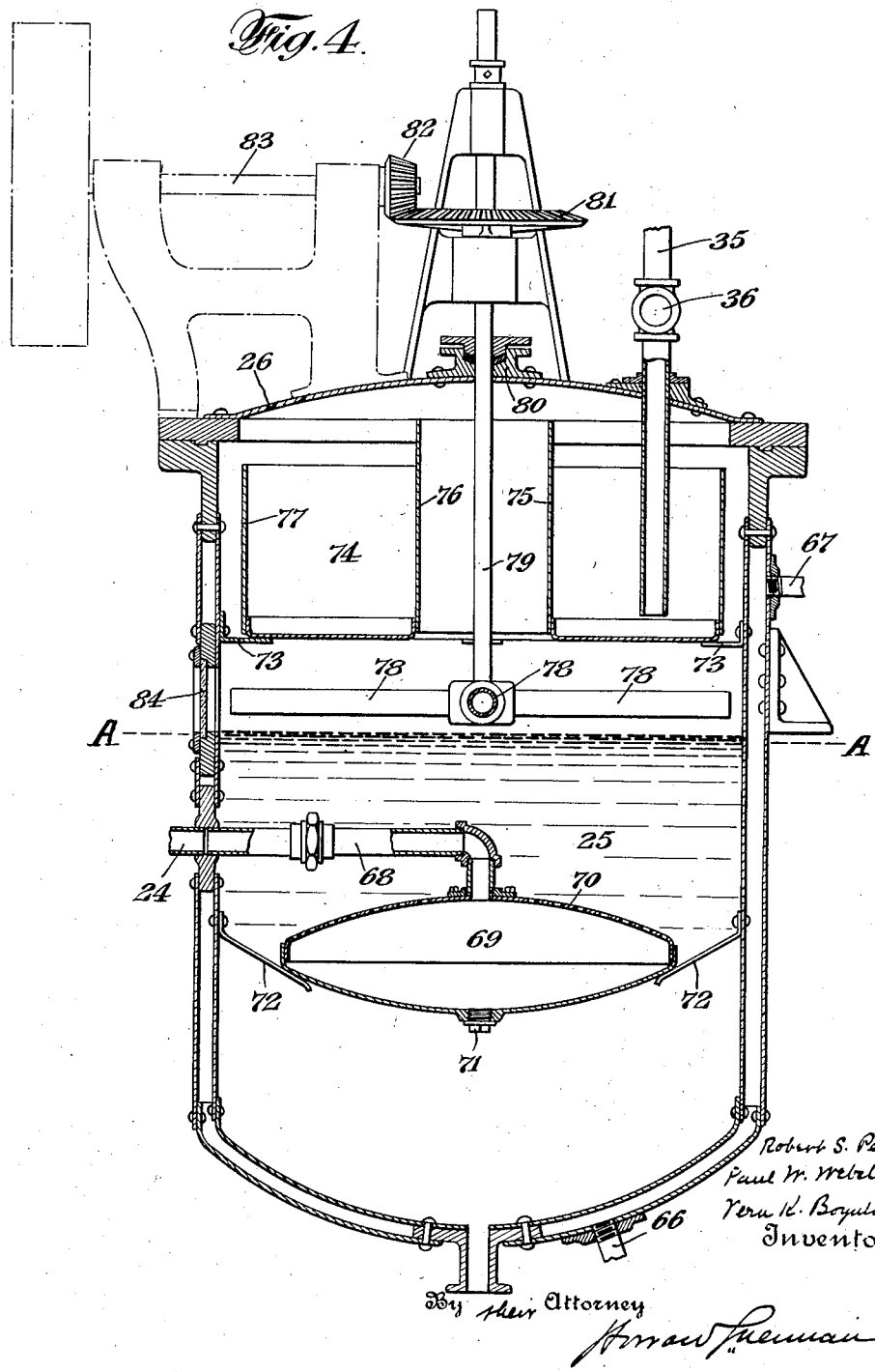

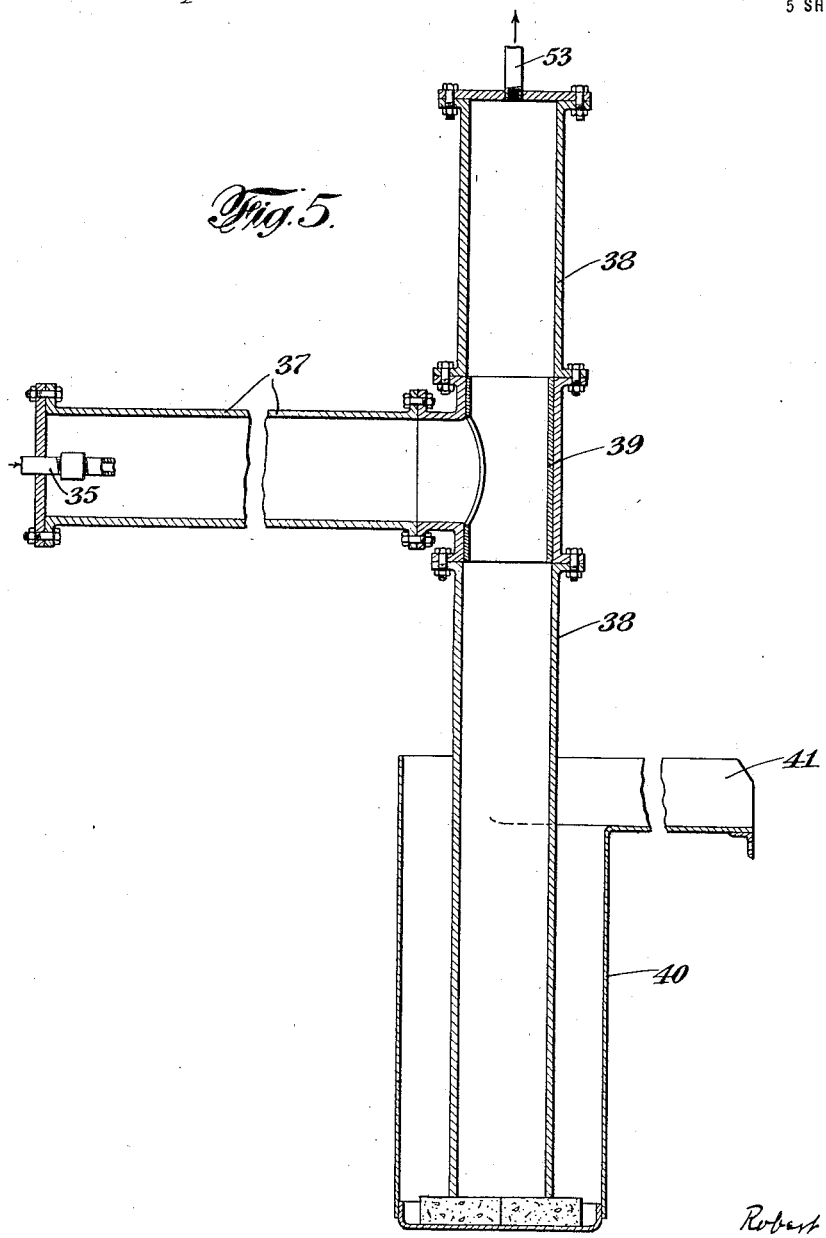

ROBERT S. PERRY, OF CAVE SPRING, GEORGIA, AND PAUL W. WEBSTER, OF PELHAM MANOR, AND VERN K. BOYNTON, OF NEW YORK, N. Y., ASSIGNORS TO PERRY & WEBSTER, INC., OF NEW YORK, N. Y.

PROCESS FOR OBTAINING SULPHUR.

1,408,467. Specification of Letters Patent. Patented Mar. 7, 1922.

Application filed July 9, 1920. Serial No. 395,105.

*To all whom it may concern:*

Be it known that we, ROBERT S. PERRY, PAUL W. WEBSTER, and VERN K. BOYNTON, citizens of the United States, residing, respectively, in Cave Spring, county of Floyd, and State of Georgia, Pelham Manor, county of Westchester, and State of New York, and New York city, county of New York, and State of New York, have invented certain new and useful Improvements in Processes for Obtaining Sulphur, of which the following is a full, clear, and exact specification.

Our invention relates to the separation of sulphur from sulphur-containing materials and refers particularly to a process for the separation of sulphur from sulphur-containing materials through the medium of a heated liquid.

One object of our invention is a process for the removal of sulphur from sulphur-containing materials by means of a heated liquid.

Another object of our invention is a continuous process for the recovery of practically pure sulphur from finely ground sulphur-containing materials and the continuous separation of the spent material from the recovered sulphur.

Another object of our invention is a process for the removal and recovery of sulphur from sulphur-containing materials in which practically all of the heat necessary for the following out of the process may be recovered for a continuing of the process.

Another object of our invention is a process for the removal of spent material from the sulphur extracted therefrom by passing the spent material through the molten sulphur.

The above and other objects of our invention will be evident upon a consideration of our specification and drawings.

Sulphur occurs in nature chiefly in the form of large deposits, usually at considerable depths below the surface, or in a co-mingled condition with rocks and ores, which may be surface deposits or may be situated below the surface.

While the recovery of sulphur from ores comprising large deep deposits can be accomplished with comparative ease, its recovery from ores in which it is co-mingled with friable materials at or near the earth's surface presents great difficulties.

Numerous methods have been proposed for the recovery of sulphur from ores but, on account of the difficulty of removing it from the interior of particles of ore and the contamination of the sulphur with fine particles of ore when the latter is ground, or disintegrates during the process, the proposed methods possess great difficulties of operation as they result either in only partial extraction of the sulphur or the necessity of its further purification, in order to obtain it in the state of purity demanded by the trade.

Further, many of the proposed methods require large quantities of steam and as the sulphur-ore deposits are frequently situated great distances from the sources of suitable fuel supplies, such processes are commercially inoperative on account of the expense necessary for shipment of ore to place of fuel supply or for shipment of fuel to ore deposits. The same difficulties present themselves in those methods in which large quantities of water are necessary for the production of steam, power, or for treating or washing purposes.

The process of our invention overcomes all of these difficulties and presents a method whereby practically pure sulphur may be obtained from sulphur-containing materials without the use of large quantities of fuel and water, which is applicable to fine materials of large and small sulphur content, and to materials which disintegrate and crumble during the operations and by its following it is possible to recover all, or nearly all, of the extractive liquids, thus causing a very considerable saving in the operation of sulphur removal and recovery.

Our process, therefore, is an economical, easily controlled and commercial method for the extraction or removal of practically pure sulphur from sulphur-containing materials and possesses new and valuable features not found in previously proposed methods.

In a broad way, the process of our invention comprises a method whereby sulphur may be extracted from sulphur-containing materials by means of heated water and the spent materials and water removed from the sulphur by a movement of the water, the sulphur being in a practically pure condition.

By "sulphur-containing materials" we mean those materials which contain or carry sulphur, or have it incorporated within them, in such a mechanical or chemical condition that it can be extracted therefrom and the spent material removed from the sulphur by the process of our invention.

While the scope of our invention is not limited to any particular form of device, the details of construction of which may be widely varied to suit particular requirements, the accompanying drawings show one form of a device suitable for the carrying out of the process of our invention in which similar parts are designated by similar numerals.

Figure 1 is a diagrammatic elevation of one form of apparatus suitable for the carrying out of the process of our invention.

Figure 2 is a top plan view of Figure 1.

Figure 3 is a vertical section of the heater.

Figure 4 is a vertical section of the separator.

Figure 5 is a broken vertical section of the steam separator.

The device, as shown in the drawings, comprises a water receptacle 10, connected by means of the pipe 11, carrying the valve 12, to the ore hopper 13. The hopper 13 opens into the upper portion of the jacketed mixer 14, having the cover 15. The bottom portion of the mixer 14 is connected by means of the pipe 16 to the receiving end of the pump 17, the discharge end of which is connected by the pipe 18 to the upper portion of the jacketed heater 19, having the cover 20. The bottom portion of the heater 19 is connected by means of the pipe 21 to the jacketed agglomerator 22 having the cover 23. The bottom portion of the agglomerator 22 is connected by means of the pipe 24 to the lower portion of the jacketed separator 25 having the cover 26. The bottom portion of the separator 25 carries the pipe 27, having the valve 28, opening into the raised end of the trough 29, the lower end of which opens into the lower end of the standard Dorr classifier 30 having the usually employed movable rakes 31, 31 connected to the rake frame 32. A pipe 33 connects the classifier 30 with the top of the tank 34.

A pipe 35, carrying the valve 36, connects the upper portion of the separator 25, with a steam separator comprising the enlarged pipe 37, connected with the pipe 38, having the wearing plate 39, the lower end of the pipe 38 being situated within the basin 40 and spaced from the bottom thereof. The extended portion 41 of the basin 40 extends above and to the central portion of the thickener, or setting tank, 42. The bottom portion of the thickener 42 is connected by means of the pipe 43, carrying the valve 44, to the upper portion of the tank 45, the lower portion of which carries the pipe 46, having the valve 47, leading to a dump or suitable place of deposit. A pipe 48, connected with a source of water supply, is coiled (49) within the tank 45 and is then extended into the pipe 50 opening into the top of the water tank 10. The upper portion of the thickener 42 is connected by means of the overflow pipe 51 to the top of the tank 34. A pipe 52, connected with a source of water supply, enters the raised portion of the trough 29. The upper portion of the pipe 38 is connected by means of the pipe 53 with the interior of the water tank 10. The bottom portion of the tank 34 is connected by means of the pipe 54 to the receiving end of the pump 55, the discharge end of which is connected by means of the pipe 56 with the top of the water tank 10. A pipe 57, connected with a source of water supply, opens into the top of the water tank 10.

A detailed drawing of the heater 19 is shown in Figure 3. This heater has jacketed walls, a suitable heating medium being capable of being introduced through the pipe 58 and withdrawn through the pipe 59. A suitable blade agitator 60 is fixedly attached to the revoluble shaft 61 passing through the stuffing box 62 within the cover 20, the upper end of the shaft 61, carrying the bevel gear 63, meshing with the bevel gear 64, carried by the revoluble shaft 65, the latter being connected to a source of revoluble power.

The agglomerator 22 is similar in construction to the heater 19 and the mixer 14 is similar to the heater 19, except that the pipe 18 is replaced by the opening of the hopper 13.

A detailed drawing of the separator 25 is shown in Figure 4. This separator has jacketed walls, a suitable heating medium being capable of being introduced through the pipe 66 and withdrawn through the pipe 67. The pipe 24 is connected with the pipe 68, which is extended downwardly and enters the hollow diaphragm member 69, which has a foraminous top 70, a clean-out plug 71 and is supported by the brackets 72, 72 fixedly attached to the walls of the separator.

Situated within the upper portion of the separator, and supported by the brackets 73, 73, is an annular basin 74, having a central opening 75 formed by the wall 76 of the basin which is extended above the outside wall 77 of the basin.

The basin 74 is spaced from the walls of the separator. The pipe 35 extends downwardly through the cover 26, the end of the pipe 35 being spaced from the bottom of the basin 74. An arm agitator 78 is fixedly attached to the revoluble shaft 79, which passes through the stuffing box 80 in the cover 26. The upper end of the shaft 79 carries the fixedly attached bevel gear 81, meshing with the bevel gear 82, carried by the revoluble shaft 83 which, in turn, is connected with a source of revoluble power. The wall of the separator carries the clear vision glass 84.

In the above description, we have applied the terms "mixer", "heater", "agglomerator" and "separator" to various parts of the drawings, simply as a ready means for designation and we do not mean to be understood that the mechanical operations indicated thereby are limited to the particular device so designated.

We give the following as an example of the carrying out of our process with the application thereof of the described devices:—

A sulphur-containing material is reduced to about 80 mesh, or to such a degree of fineness as is sufficient to unlock and separate the sulphur in the subsequent operations, and continuously introduced into the hopper 13 simultaneously with a stream of water through the pipe 11 from the tank 10, the proportions of the mixture being about five (5) parts of water to one (1) part of ore. The material and water pass into the mixer 14, in which they are thoroughly mixed by means of the agitator and are heated to a temperature below the boiling point of water by heating medium in the jacketed walls of the mixer. The heated mixture of material and water pass to the pump 17 whence they are forced through the pipe 18 into the heater 19, in which they are thoroughly mixed and heated to about 120° C. From the heater 19 the mixture passes through the pipe 21 into the agglomerator 22 in which the mixture is stirred and the temperature maintained at about 120° C. In the heater 19 and the agglomerator 22, the temperature of the mass causes the sulphur to melt and flow from the interstices of the ore, thus producing a mixture of spent material, or gangue, molten sulphur and water. While the general effect produced in the heater and agglomerator are the same, that is, the melting of the sulphur and its separation from the ore, there is a specific effect produced in that the small globules of melted sulphur, first obtained in its extraction from the material, have a tendency to agglomerate into larger globules by the treatment and this agglomeration, which commences in the heater, is brought to a greater extent of completeness in the agglomerator. From the agglomerator 22 the mixture of spent material, sulphur more or less agglomerated and the water pass through the pipe 24 into the separator 25. The mixture passes through the pipes 24 and 68 into the diaphragm member 69 and thence outwardly through the foraminous top 70 into the separator, in which it is maintained at a temperature sufficient to retain the sulphur in a molten condition. The heavier sulphur remains in the lower portion of the separator whereas the lighter gangue and water pass to the upper portion of the separator over the side 77 of, and into, the basin 74 and thence upwardly and outwardly through the pipe 35. The valve 28 of the pipe 27 is so set as to maintain a quantity of sulphur within the separator to a height represented approximately by the line A—A. It will thus be noted that all of the materials passing through the diaphragm 69 will pass upwardly through a molten mass of sulphur which will have a tendency to agglomerate and collect the molten sulphur thus introduced. The molten sulphur is converted into its solid condition by passing through the pipe 27 into the trough 29, through which a constant flow of water is maintained by means of the pipe 52. The sulphur is thus obtained in a granulated condition particularly suitable for handling, storage and shipping. The water and sulphur pass from the trough 29 into the classifier 30, the sulphur thence passing upwardly and outwardly into suitable containers. The water introduced into the trough 29, and which has absorbed the heat of the molten sulphur, is carried to the tank 34 by means of the pipe 33.

By means of the pump 17 and the proper regulation of the valves 28 and 36, a predetermined pressure may be maintained within the heater 19, the agglomerator 22 and the separator 25 and in actual practice a temperature and pressure are maintained that will melt the sulphur without the formation of steam.

The gangue and hot water from the separated sulphur passes through the pipes 35 and 37 into the pipe 38, and the reduction of pressure will cause some of the water to flash into steam which passes through the pipe 50 to the tank 10 for the purpose of heating the water contained therein.

The gangue and hot water will pass downwardly through the pipe 38 into the basin 40, and thence through the extended portion, or trough, 41, into the thickener 42. The basin 40 is of sufficient height to produce by hydrostatic pressure of its contents a sufficient pressure to force the steam through the pipe 53.

The gangue settles in the thickener 42 and thence passes outwardly through the pipe 43 into the tank 45 and thence outwardly through the pipe 46 to a desirable dump. By a regulation of the valves 44 and 47, the mass gangue may be maintained at a suitable height in the tank 45. Fresh water passes through the pipe 48 and the coil 49, thus absorbing the heat of the gangue, and thence through the pipe 50 to the tank 10. The hot overflow water from the thickener 42 passes through the pipe 51 to the tank 34 and the hot water in the tank 34 passes through the pipe 54 to the pump 55 and thence is forced through the pipe 56 to the tank 10. The pipe 57 may be employed to introduce additional water into the tank 10, when the recovered water is not sufficient for the continuance of the operation.

All of the devices, containers, pipes and parts may be covered with heat non-conductors in the ordinary manner, if desired.

It is evident from a consideration of the above that our process effectively separates and recovers sulphur from sulphur-carrying materials at a minimum of expense, in that it is continuous, automatic, produces the sulphur in a practically dry commercial form and that practically all of the heat necessary in the following out of the method is recovered and returned thereto, thus reducing the amount of necessary heating material to a minimum.

It is further evident that while the process is described as continuous in its operation, it may be employed in an intermittent manner and that the various steps of the operation may be used irrespective of a continuous process.

We do not limit ourselves to the particular chemicals, quantities, temperatures and sequence of operative steps mentioned, nor to the particular devices described and shown, all of which may be varied without going beyond the scope of our invention as described and claimed.

What we claim is:—

1. In a process of separating sulphur from a mixture of gangue, sulphur and water, the step which comprises passing the mixture under pressure into a bath of molten sulphur, whereby the gangue and water will pass therethrough accumulating sulphur of the mixture in the molten mass.

2. The process of separating sulphur from sulphur-containing material which comprises heating a mixture of sulphur-containing material and water under pressure to a temperature sufficient to melt the sulphur, agitating the mixture until sulphur is separated from the material, passing the mixture into a bath of molten sulphur, whereby the gangue and water will pass therethrough accumulating sulphur of the mixture in the molten mass and removing the gangue and water from contact with the molten sulphur.

3. The process of separating sulphur from sulphur-containing material which comprises heating a mixture of sulphur-containing material and water under pressure to a temperature sufficient to melt the sulphur, agitating the mixture until sulphur is separated from the material, passing the mixture under pressure into a bath of molten sulphur, whereby the gangue and water will pass therethrough accumulating sulphur of the mixture in the molten mass and removing the gangue and water from contact with the molten sulphur.

4. The process of separating sulphur from sulphur containing material which comprises heating a mixture of sulphur-containing material and water under pressure to a temperature sufficient to melt the sulphur, agitating the mixture until sulphur is separated from the material, passing the mixture into a bath of molten sulphur, whereby the gangue and water will pass therethrough accumulating sulphur of the mixture in the molten mass, removing the gangue and water from contact with the molten sulphur and returning practically all of the employed caloric efficiency to the first operation.

5. The process of separating sulphur from sulphur-containing material which comprises heating a mixture of sulphur-containing material and water under pressure to a temperature sufficient to melt the sulphur, agitating the mixture until sulphur is separated from the material, passing the mixture under pressure into a bath of molten sulphur, whereby the gangue and water will pass therethrough accumulating sulphur of the mixture in the molten mass, removing the gangue and water from contact with the molten sulphur and returning practically all of the employed caloric efficiency to the first operation.

6. In a continuous process for the separation of sulphur from sulphur-bearing material the steps comprising a continuous progressive movement of a mixture of sulphur-bearing material and water, heating the mixture under pressure to the melting temperature of sulphur during said movement and causing a movement of the mixture during its progressive movement whereby sulphur will be agglomerated into molten masses within the mixture.

7. In a continuous process for the separation of sulphur from sulphur-bearing materials the steps comprising immersing the finely ground material in water, causing a continuous progressive movement of the mixture, heating the mixture under pressure during its progressive movement until practically all of the sulphur is extracted from the material and causing a movement of the mixture during its progressive movement whereby extracted sulphur will be agglomerated into molten masses within the mixture.

8. A continuous process for the separation of sulphur from sulphur-bearing material which comprises a continuous progressive movement of a mixture of sulphur-bearing material and water, heating the mixture under pressure to the melting temperature of sulphur during said movement, causing a movement of the mixture during its progressive movement whereby sulphur will be agglomerated into molten masses within the mixture and separating the gangue and water from contact with the sulphur.

9. A continuous process for the separation of sulphur from sulphur-bearing materials which comprises immersing the finely ground material in water, causing a continuous progressive movement of the mixture, heating the mixture under pressure during its progressive movement until practically all of the sulphur is extracted from the material, causing a movement of the mixture during its progressive movement whereby extracted sulphur will be agglomerated into molten masses within the mixture and separating the gangue and water from contact with the sulphur.

10. A continuous process for the separation of sulphur from sulphur-bearing material which comprises a continuous progressive movement of a mixture of sulphur-bearing material and water, heating the mixture under pressure to the melting temperature of sulphur during said movement, causing a movement of the mixture during its progressive movement whereby sulphur will be agglomerated into molten masses within the mixture and separating the gangue and water from the sulphur by passing the mixture into a bath of molten sulphur whereby the gangue and water will pass therethrough accumulating sulphur in the molten mass.

11. A continuous process for the separation of sulphur from sulphur-bearing materials which comprises immersing the finely ground material in water, causing a continuous progressive movement of the mixture, heating the mixture under pressure during its progressive movement until practically all of the sulphur is extracted from the material, causing a movement of the mixture during its progressive movement whereby extracted sulphur will be agglomerated into molten masses within the mixture and separating the gangue and water from the sulphur by passing the mixture into a bath of molten sulphur whereby the gangue and water will pass therethrough accumulating sulphur in the molten mass.

12. A continuous process for the separation of sulphur from a sulphur-containing material which comprises, heating under pressure a mixture of a sulphur-containing material and water to a temperature of about 120° C. causing a movement of the mixture whereby the extracted sulphur will agglomerate into a molten mass and removing the material and water from contact with the sulphur.

13. The process of separating sulphur from sulphur-containing material which comprises heating a mixture of sulphur-containing material and water under pressure to a temperature sufficient to melt the sulphur and passing the heated mixture under pressure through a plurality of receptacles whereby the sulphur will be agglomerated.

14. The process of separating sulphur from sulphur-containing material which comprises heating a mixture of sulphur-containing material and water under pressure to a temperature sufficient to melt the sulphur and passing the heated mixture under pressure through a plurality of receptacles whereby the sulphur will be agglomerated and separating the spent material and water from the sulphur.

Signed at New York, in the county of New York and State of New York, this 1st day of July, 1920.

ROBERT S. PERRY.
PAUL W. WEBSTER.
VERN K. BOYNTON.